(12) United States Patent
Dalton, Jr. et al.

(10) Patent No.: US 7,743,263 B2
(45) Date of Patent: Jun. 22, 2010

(54) METHOD AND SYSTEM FOR ROUTING CALLS OVER A PACKET SWITCHED COMPUTER NETWORK

(75) Inventors: James P. G. Dalton, Jr., Atlanta, GA (US); Dmitry Isakbayev, Cumming, GA (US); Vikrant Mathur, Herndon, VA (US)

(73) Assignee: Transnexus, Inc., Atlanta, GA (US)

( * ) Notice: Subject to any disclaimer, the term of this patent is extended or adjusted under 35 U.S.C. 154(b) by 1506 days.

(21) Appl. No.: 11/075,040

(22) Filed: Mar. 8, 2005

(65) Prior Publication Data
US 2005/0201364 A1 Sep. 15, 2005

Related U.S. Application Data

(60) Provisional application No. 60/552,341, filed on Mar. 11, 2004.

(51) Int. Cl.
*G06F 11/30* (2006.01)
(52) U.S. Cl. ................. 713/201; 713/200; 370/352
(58) Field of Classification Search ............. 713/163, 713/157, 160, 168, 201, 200
See application file for complete search history.

(56) References Cited

U.S. PATENT DOCUMENTS

| | | | |
|---|---|---|---|
| 4,726,056 A | 2/1988 | An et al. ............. | 379/115 |
| 4,979,118 A | 12/1990 | Kheradpir ............ | 364/436 |
| 5,155,763 A | 10/1992 | Bigus et al. ........... | 379/113 |
| 5,185,780 A | 2/1993 | Leggett .............. | 379/34 |
| 5,251,152 A | 10/1993 | Notess ............... | 364/550 |
| 5,325,290 A | 6/1994 | Cauffman et al. ........ | 364/401 |
| 5,404,516 A | 4/1995 | Georgiades et al. ...... | 395/650 |
| 5,408,465 A | 4/1995 | Gusella et al. ......... | 370/17 |
| 5,434,848 A | 7/1995 | Chimento, Jr. et al. ... | 370/17 |
| 5,473,630 A | 12/1995 | Penzias et al. ......... | 375/114 |
| 5,563,939 A | 10/1996 | La Porta et al. ........ | 379/220 |
| 5,570,417 A | 10/1996 | Byers et al. ........... | 379/115 |

(Continued)

FOREIGN PATENT DOCUMENTS

EP     0 781 015 A2    6/1997

(Continued)

OTHER PUBLICATIONS

PCT International Preliminary Report dated Jan. 23, 2006 for International Application No. PCT/US01/28931.

(Continued)

*Primary Examiner*—Creighton Smith
(74) *Attorney, Agent, or Firm*—Sentry Law Group; Steven P. Wigmore

(57) ABSTRACT

The present invention describes how a trusted network routing authority, such as a VoIP inter-exchange carrier or clearinghouse can provide routing and secure access control across multiple network domains with a single routing and admission request. This technology can improve network efficiency and quality of service when an Internet Protocol (IP) communication transaction, such as a Voice over IP (VoIP), must be routed across multiple devices or administrative domains. This technology defines the technique of performing multiple route look-ups at the source of the call path to determine all possible routes across intermediate domains to the final destination. The VoIP inter-exchange carrier or clearinghouse then provides routing and access permission tokens for the entire call path to the call source.

20 Claims, 10 Drawing Sheets

U.S. PATENT DOCUMENTS

| | | | |
|---|---|---|---|
| 5,581,544 A | 12/1996 | Hamada et al. | 370/253 |
| 5,600,794 A | 2/1997 | Callon | 395/200.01 |
| 5,606,602 A | 2/1997 | Johnson et al. | 379/115 |
| 5,633,919 A | 5/1997 | Hogan et al. | 379/115 |
| 5,638,433 A | 6/1997 | Bubien, Jr. et al. | 379/130 |
| 5,668,955 A | 9/1997 | deCiutiis et al. | 379/130 |
| 5,675,636 A | 10/1997 | Gray | 379/114 |
| 5,712,907 A | 1/1998 | Wegner et al. | 379/112 |
| 5,740,361 A | 4/1998 | Brown | 395/187.01 |
| 5,790,642 A | 8/1998 | Taylor et al. | 379/112 |
| 5,799,072 A | 8/1998 | Vulcan et al. | 379/114 |
| 5,867,495 A | 2/1999 | Elliott et al. | 370/352 |
| 5,892,753 A | 4/1999 | Badt et al. | 370/233 |
| 5,898,668 A | 4/1999 | Shaffer | 370/230 |
| 5,898,673 A | 4/1999 | Riggan et al. | 370/237 |
| 5,917,891 A | 6/1999 | Will | 379/88.03 |
| 5,917,897 A | 6/1999 | Johnson et al. | 379/114 |
| 5,917,902 A | 6/1999 | Saucier | 379/242 |
| 5,943,657 A | 8/1999 | Freestone et al. | 705/400 |
| 5,966,427 A | 10/1999 | Shaffer et al. | 379/1 |
| 5,991,373 A | 11/1999 | Pattison et al. | 379/93.17 |
| 5,995,554 A | 11/1999 | Lang | 375/295 |
| 6,005,925 A | 12/1999 | Johnson et al. | 379/112 |
| 6,005,926 A | 12/1999 | Mashinsky | 379/114 |
| 6,049,531 A | 4/2000 | Roy | 370/260 |
| 6,067,287 A | 5/2000 | Chung-Ju et al. | 370/232 |
| 6,085,238 A | 7/2000 | Yuasa et al. | 709/223 |
| 6,128,280 A | 10/2000 | Jamoussi et al. | 370/230 |
| 6,128,304 A | 10/2000 | Gardell et al. | 370/401 |
| 6,137,869 A | 10/2000 | Voit et al. | 379/114.01 |
| 6,157,648 A | 12/2000 | Voit et al. | 370/401 |
| 6,178,510 B1 | 1/2001 | O'Connor et al. | 713/201 |
| 6,205,211 B1 | 3/2001 | Thomas et al. | 379/114 |
| 6,229,804 B1 | 5/2001 | Mortsolf et al. | 370/352 |
| 6,240,449 B1 | 5/2001 | Nadeau | 709/223 |
| 6,259,691 B1 | 7/2001 | Naudus | 370/352 |
| 6,263,051 B1 | 7/2001 | Saylor et al. | 379/88.17 |
| 6,275,490 B1 | 8/2001 | Mattaway et al. | 370/352 |
| 6,304,551 B1 | 10/2001 | Ramamurthy et al. | 370/232 |
| 6,310,873 B1 | 10/2001 | Rainis et al. | 370/356 |
| 6,339,595 B1 | 1/2002 | Rekhter et al. | 370/392 |
| 6,345,090 B1 | 2/2002 | Walker et al. | 379/114.12 |
| 6,366,577 B1 | 4/2002 | Donovan | 370/352 |
| 6,404,746 B1 | 6/2002 | Cave et al. | 370/352 |
| 6,426,955 B1 | 7/2002 | Dalton, Jr. et al. | 370/401 |
| 6,430,282 B1 | 8/2002 | Bannister et al. | 379/211.02 |
| 6,459,708 B1 | 10/2002 | Cox et al. | 370/537 |
| 6,477,164 B1 | 11/2002 | Vargo et al. | 370/356 |
| 6,487,283 B2 | 11/2002 | Thomas et al. | 379/112.01 |
| 6,526,131 B1 | 2/2003 | Zimmerman et al. | 379/242 |
| 6,570,870 B1 | 5/2003 | Berstis | 370/352 |
| 6,611,519 B1 | 8/2003 | Howe | 370/428 |
| 6,614,781 B1 | 9/2003 | Elliott et al. | 370/352 |
| 6,615,349 B1 | 9/2003 | Hair | 713/165 |
| 6,658,568 B1 | 12/2003 | Ginter et al. | 713/193 |
| 6,665,271 B1 | 12/2003 | Thomas et al. | 370/252 |
| 6,680,948 B1 | 1/2004 | Majd et al. | 370/401 |
| 6,707,812 B1 | 3/2004 | Bowman-Amuah | 370/353 |
| 6,735,177 B1 | 5/2004 | Suzuki | 370/238 |
| 6,751,652 B1 | 6/2004 | Thomas | 709/204 |
| 6,757,823 B1 | 6/2004 | Rao et al. | 713/153 |
| 6,765,896 B1 | 7/2004 | Ahmed et al. | 370/338 |
| 6,795,867 B1 | 9/2004 | Ma et al. | 709/227 |
| 6,996,093 B2 | 2/2006 | Dalton, Jr. et al. | 370/356 |
| 7,017,050 B2 | 3/2006 | Dalton, Jr. et al. | 713/201 |
| 2003/0012178 A1 | 1/2003 | Mussman et al. | |
| 2003/0095541 A1 | 5/2003 | Chang et al. | 370/352 |
| 2003/0193933 A1 | 10/2003 | Jonas et al. | 370/356 |
| 2004/0042606 A1 | 3/2004 | Zino et al. | |

FOREIGN PATENT DOCUMENTS

| | | |
|---|---|---|
| EP | 0 824 295 A2 | 2/1998 |
| EP | 0 948 164 | 10/1999 |
| GB | 2 301 264 | 11/1996 |
| WO | WO 97/14236 | 4/1997 |
| WO | WO 97/23078 | 6/1997 |
| WO | WO 98/18237 | 4/1998 |
| WO | WO 98/36543 | 8/1998 |
| WO | WO 98/37665 | 8/1998 |
| WO | WO 98/48542 | 10/1998 |
| WO | WO 99/11051 | 3/1999 |
| WO | WO 99/14931 | 3/1999 |
| WO | WO 99/14932 | 3/1999 |
| WO | WO 99/26153 | 5/1999 |
| WO | WO 00/48102 | 8/2000 |
| WO | WO 00/49551 | 8/2000 |
| WO | WO 00/52905 | 9/2000 |
| WO | WO 01/47232 A2 | 6/2001 |
| WO | WO 01/47235 A2 | 6/2001 |
| WO | WO 01/52476 A2 | 7/2001 |
| WO | WO 01/63820 A2 | 8/2001 |
| WO | WO 02/23854 A2 | 3/2002 |
| WO | WO 2005/089147 A2 | 9/2005 |
| WO | WO 2006/065789 A2 | 6/2006 |

OTHER PUBLICATIONS

International Search Report dated Jul. 26, 2006 for International Application No. PCT/US05/07560 (1-pg.).

ETSI, "*Telecommunications and Internet Protocol Harmonization Over Networks (TIPHON) Release 4; Open Settlement Protocol (OSP) for Inter-Domain pricing, authorization and usage exchange,*" ETSI TS 101 321, V4.1.1 (Nov. 2003) Technical Specification, pp. 49.

Hansson, Allan et al., "*Phone Doubler—A step towards integrated Internet and telephone communities,*" Ericsson Review No. 4, 1997, Abstract, XP-000725693, pp. 142-151.

Johannesson, Nils Olof, "*The ETSI Computation Model: A Tool for Transmission Planning of Telephone Networks,*" IEEE Communications Magazine, Jan. 1997, pp. 70-79.

Netscape Communications Corporation, "*Introduction to SSL,*" Oct. 9, 1998, [Retrieved from Internet May 19, 2004], http://developer.netscape.com/docs/manuals/security/sslin/contents.htm, p. 12.

RSA Security Press Release, "*TransNexus Integrates Industry Leader RSA Security's BSAFE Encryption Software Into Its ClearIP(SM) Clearinghouse Solution,*" Oct. 21, 1999, Abstract XP-002193409, www.rsasecurity.com.

Rudkin, S. et al., "*Real-time applications on the Internet,*" BT Technology Journal, vol. 15, No. 2, Apr. 1997, pp. 209-225.

Sin, Sam-Kit et al., "*A New Design Methodology for Optimal Interpolative Neural Networks with Application to the Localization and Classification of Acoustic Transients,*" IEEE Conference on Neural Networks for Ocean Engineering, 1991, pp. 329-340.

The Ascend MaxVoice Gateway, "*The asnet pipeline,*" Abstract XP-002096239, www.asnet.co.nz/pipeline/sum97/tamvg.html, Mar. 11, 1999.

Thom, Gary A., "*H.323: The Multimedia Communications Standard for Local Area Networks,*" IEEE Communications Magazine, Abstract, XP 000636454, Dec. 1996, pp. 52-56.

TransNexus Home Page, Printed May 17, 2005, www.transnexus.com, 2 pp.

TransNexus Press Release, "*Agis and Popstar Introduce Profit-Generating Internet Fax Services to ISP Partners and Customers Worldwide,*" Abstract XP-002193408, Jun. 24, 1999, www.transnexus.com, 3 pp.

Chaniotakis et al., "*Parlay and Mobile Agents in a Homogenized Service Provision Architecture,*" IEEE; Universal Multiservice Networks; ECUMN 2002; 2nd European Conference on Apr. 8-10, 2002; pp. 150-154.

Liao, Wanjiun; "*Mobile Internet Telephony Protocol: An application layer protocol for mobile Internet telephony services,*" Communications, 1999; ICC '99; 1999 IEEE International Conference; vol. 1; Jun. 6-10, 1999; pp. 339-343.

Maresca et al.; "*Internet Protocol Support for Telephony,*" Proceedings of the IEEE, vol. 92, No. 9; Sep. 2004; pp. 1463-1477.

METHOD AND SYSTEM FOR ROUTING CALLS OVER A PACKET SWITCHED COMPUTER NETWORK

STATEMENT REGARDING RELATED APPLICATIONS

The present application claims priority to provisional patent application entitled, "Look Ahead Routing," filed on Mar. 11, 2004 and assigned U.S. Application Ser. No. 60/552,341. The entire contents of this provisional application are hereby incorporated by reference.

TECHNICAL FIELD

The present invention relates to communications over a packet switched computer network. More particularly, the present invention relates to routing for voice over Internet Protocol (VoIP) telephony.

BACKGROUND OF THE INVENTION

Telecommunications using IP networks and VoIP technology have become a practical substitute for the traditional Public Switched Telephone Network (PSTN) that uses dedicated circuits or channels to convey telecommunications such as voice calls, facsimiles or video conferences. Unlike the PSTN model, the IP transmission model does not dedicate a network circuit or channel for a telecommunication session because a VoIP telecommunication session is transmitted via IP data packets. Two VoIP endpoints communicate directly across the IP network peer to peer. IP data packets, carrying the VoIP communication, are sent asynchronously from the source to the destination across the mesh of the IP network.

One advantage of VoIP peer to peer communications is the elimination of costly network circuits and switches dedicated to voice conversations. With VoIP technology, voice conversations can be transmitted across the same IP data network used to transmit data applications such as e-mail and web browsing. The use of a single data network for all communications and the elimination of a circuit switched networks dedicated for voice communications can offer significant savings.

A problem facing peer to peer VoIP communications, however, is the problem of global number discovery and interconnection. For example, the customers of a local telephone service provider expect to be able to send to and receive calls from any telephone number in the world. However, the telephone network of a single service provider is limited. Therefore, to provide global calling services, the local service provider must be interconnected with all other telephone networks in the world. Interconnect agreements between telephone service providers typically require a mutual billing settlement agreement for interconnect traffic exchange to ensure the terminating network is compensated for completing telephone calls.

In the traditional PTSN model, this problem was solved by routing phone calls to the switch of a dominant inter-exchange carrier (IXCs) with interconnection to any telephone number in the world. For example, the AT&T network is interconnected with the gateway switches of all national telephone provides and can ensure that a PSTN call can be routed to any telephone on Earth.

The market model for VoIP is similar to the PTSN inter-exchange model, but it is not as simple in structure. In VoIP networks, traditional telephone numbers are correlated to IP addresses. VoIP service providers must be able to route telephone calls—dialed to traditional telephone numbers—to the IP address of the VoIP provider serving the called party. A solution to this routing discovery problem has been the development of VoIP inter-exchange carriers or clearinghouses. The VoIP inter-exchange carrier provides value by facilitating the exchange of calls between hundreds of VoIP service providers. To replicate the service of the VoIP inter-exchange carrier, each VoIP service provider would have to establish a bilateral interconnect agreement with every other VoIP service provider—a huge administrative task.

FIG. 1a illustrates one solution of the conventional art. The term "conventional art" as used in this specification is not statutory "prior art" under 35 U.S.C. §102(b). This conventional art is being presented only to explain Applicant's invention in terms of technology that is existing at the filing date of this specification. Therefore, FIGS. 1a-2b do not qualify as statutory prior art.

The VoIP Carrier or Clearinghouse 100 of FIG. 1a has interconnect and settlement billing agreements with a large number of VoIP operators around the world. The VoIP Carrier or Clearinghouse operates 100 the central database which correlates the telephone numbers and IP addresses for each VoIP service provider.

While FIG. 1a shows only one source and destination VoIP network, this example applies for a very large number of VoIP service providers. When the customer of the Source VoIP Network 110 dials a phone number that cannot be completed in the Source VoIP Network 110, the Source VoIP Network 110 will send a route/access query 130 to the VoIP Carrier 100. The VoIP Carrier 100, which has the central routing database of all correlating telephone numbers and IP addresses, performs a route lookup to determine which IP address, or addresses, can terminate the VoIP call to the called number.

In the example illustrated in FIG. 1a, the route/access query 130 from the VoIP Carrier 100 returns the IP address of the Destination VoIP Network 120. Given this information, the Source VoIP Network 110 performs a call setup 140 to the destination network 120 to complete the call to the called telephone number.

It is important to note that the VoIP inter-exchange carrier or clearinghouse model differs from the circuit switched inter-exchange carrier model. In the circuit switched inter-exchange carrier model, the call is routed between the source and destination network via the inter-exchange carrier's switch. The inter-exchange switch is used for routing, inter-carrier access control and call detail record (CDR) collection for settlement billing.

In the VoIP inter-exchange carrier or clearinghouse model, the call is transmitted peer to peer from the source to the destination directly across the mesh of the IP network. There is no switch in the call path to enforce inter-carrier access control or to collect call detail records. In the VoIP model, the inter-exchange carrier or clearinghouse enforces access control by including an access token with the IP address of a destination network. The source network then includes this access token in the peer to peer call setup request to the destination network. While the destination network probably does not recognize the source network, the destination will validate the access token to determine that the call was authorized by its trusted inter-exchange carrier or clearinghouse who will guarantee payment for terminating the call.

Accounting for inter-carrier settlement billing is accomplished by call detail record collection from both the source and destination networks 110, 120. At the completion of the call, both the source and destination networks send call detail records to the VoIP inter-exchange carrier or clearinghouse.

This is illustrated in FIG. 1b which shows VoIP Carrier 100 receiving a source call detail record 150a from the Source VoIP Network 110 and destination call detail record 150b from the Destination VoIP Network 120.

The previous paragraphs describe the basic peer to peer VoIP clearing and settlement call scenario. However, technology limitations and market conditions have created new variations of this basic call scenario that introduce an intermediate proxy device between the source and destination network.

FIG. 2a illustrates the presence of a VoIP Proxy Device or intermediate network 200 for peer to peer calls between a source and destination VoIP network. Common reasons for routing peer to peer VoIP calls via a proxy device or intermediate network 200 are: (A) the proxy device acts as a firewall to allow signaling of VoIP traffic between a private IP network with private IP addresses and VoIP networks with public IP addresses; (B) the source and destination networks 110, 120 use different signaling protocols and an inter-working device is required for protocol translation between the networks.

The call scenario for a VoIP inter-exchange carrier or clearinghouse 100 when a proxy or intermediate network 200 is used is illustrated in FIG. 2a and described below. When the customer of the Source VoIP Network 110 dials a phone number that cannot be completed in the Source VoIP Network 110, the Source VoIP Network 110 will send a route/access query 130a to the VoIP Carrier 100. The VoIP Carrier 100 performs a route lookup to determine which IP address, or addresses, can terminate the VoIP call to the called number.

In the example illustrated in FIG. 2a, the route/access query 130a from the VoIP Carrier 100 returns the IP address of the VoIP Proxy Device 200. Given this information, the Source VoIP Network 110 performs a call setup 140a to the VoIP Proxy Device 200. The VoIP Proxy Device 200 validates the access token in the call setup and accepts the call. If the VoIP Proxy Device cannot complete the call, it will send a route/access query 130b to the VoIP Carrier 100. The VoIP Carrier 100 performs a route lookup and determines that the route to the called number from the VoIP Proxy Device 200 can be completed by Destination VoIP Network 120.

The VoIP Carrier 100 returns the destination IP address in the route/access query response 130b to the VoIP Proxy Device 200. The VoIP Proxy Device 200 then sends a call setup 140b to the Destination VoIP Network 120 which validates the access token and completes the call.

FIG. 2b illustrates how call detail records are reported to the VoIP Carrier 100 when the call is finished. The Source VoIP Network 110 reports a source call detail record 150a for the first call leg. The VoIP Proxy Device 200 reports a destination call detail record 150c for the first call leg. The VoIP Proxy Device 200 reports a source call detail record 150d for the second call leg. The Destination VoIP Network 120 reports a destination call detail record 150b for the second call leg.

Accordingly, there is a need in the art for a more simple routing method that does not require intermediate networks to communicate with a VoIP clearinghouse to place a call. There is further need in the art for a simplified routing method that can reduce a number of call detail records reported to a VoIP clearinghouse from one or more intermediate networks used to place a call.

SUMMARY OF THE INVENTION

A VoIP inter-exchange carrier or clearinghouse can provide routing and secure access control across multiple network domains with a single routing and admission request. This technology can improve network efficiency and quality of service when an Internet Protocol (IP) communication transaction, such as a Voice over IP (VoIP), must be routed across multiple devices or administrative domains.

This technology defines the technique of performing multiple route look-ups at the source of the call path to determine all possible routes across intermediate domains to the final destination. The VoIP inter-exchange carrier or clearinghouse then provides routing and access permission tokens for the entire call path to the call source. The call source, then establishes a communication session with the first intermediate network defined by the routing authority. The call source transmits the access permission token, provided by the routing authority, to the first intermediate network. The first intermediate network validates the token and accepts the call session from the call source. As part of the token validation process, the intermediate network extracts the IP address of the destination network from the token. The intermediate network may then use this information to complete the call to the destination network. This technology can also be applied to call scenarios that include multiple intermediate networks between the source and destination.

According to one exemplary aspect of the technology, the VoIP inter-exchange clearinghouse can provide the call source with multiple call paths that can complete a call session. These call paths can be ranked by weight calculations. The weight calculations can be made by the VoIP inter-exchange clearinghouse based on weights assigned to each intermediate network and destination network that may be part of a particular call path.

According to another exemplary aspect, the VoIP inter-exchange clearinghouse can provide a token that includes optional legs for a call path. In other words, a token can include authorizations for numerous legs of a call path to address the possibility that a particular leg of a call path may fail.

The term, "VoIP Carrier or Clearinghouse," as defined in this specification comprises any single device or a plurality of devices that can identify call paths across a packet switched computer network and that can create permission tokens for networks that are part of a call path. The term, "source VoIP network," as defined in this specification comprises any single device or a plurality of devices that can originate communications. The term, "intermediate network," as defined in this specification comprises any single device such as, but not limited to, a proxy, or a plurality of devices that can route communications from a call source to other intermediate networks or destination networks. Similarly, the term, "destination network," as defined in this specification comprises any single device or a plurality of devices that can complete communications from a call source or an intermediate network.

DETAILED DESCRIPTION OF THE EXEMPLARY EMBODIMENTS

Figure 1A:
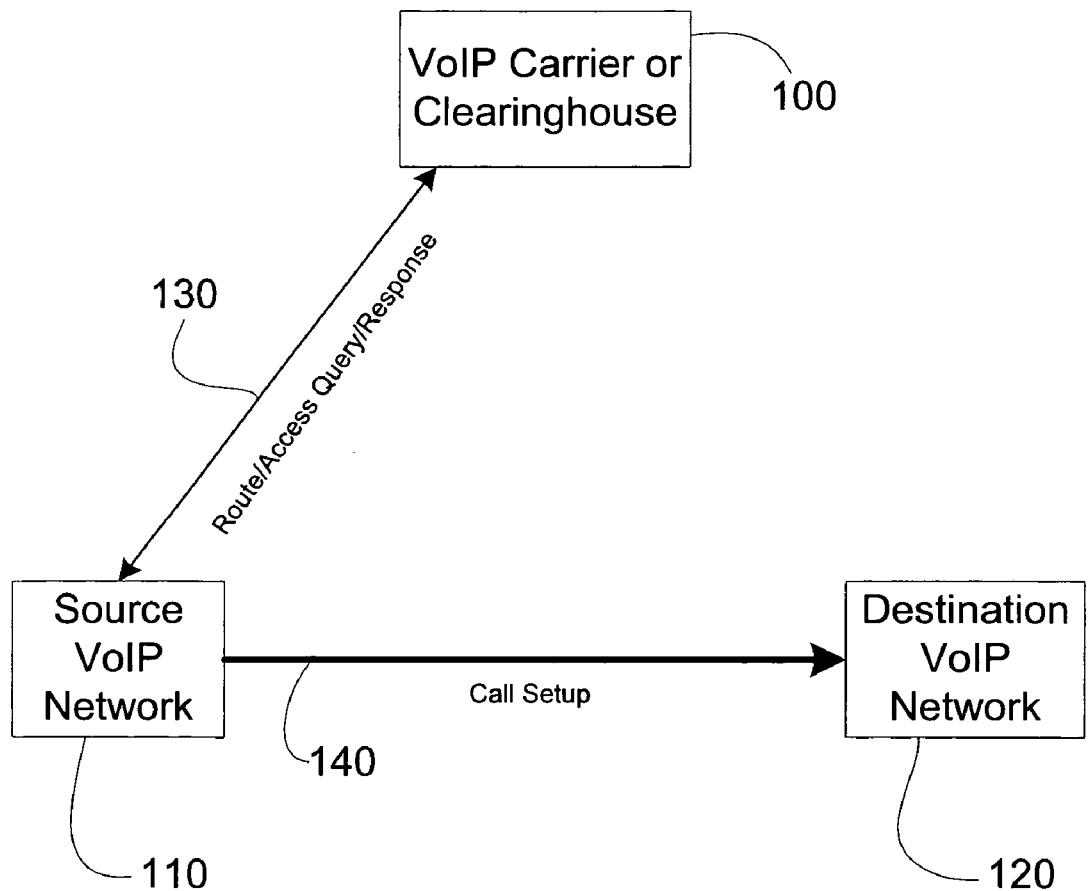
FIG. 1a is a functional block diagram of a conventional packet switched network that has a source VoIP network that communicates with a VoIP carrier to complete a phone call.
Figure 1B:
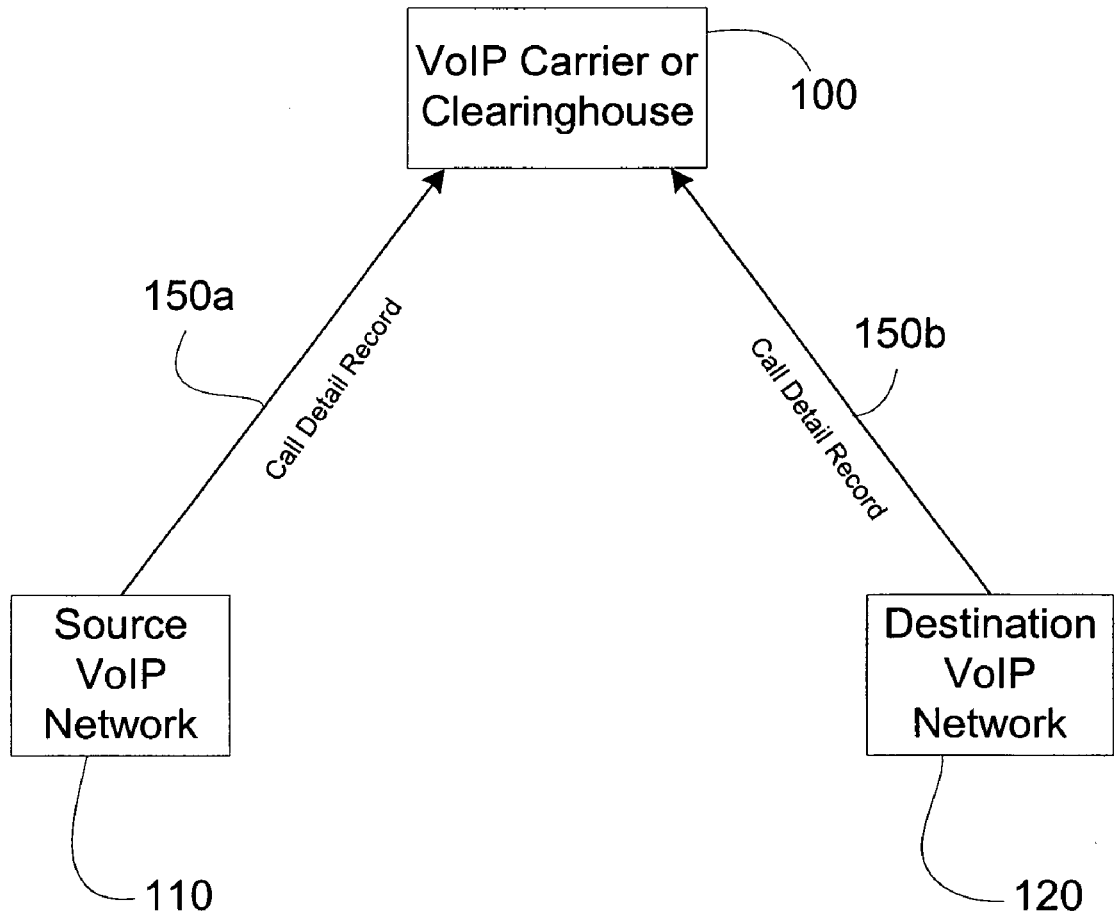
FIG. 1b is a functional block diagram of a conventional packet switched network that has a source VoIP network that communicates a call detail record to a VoIP carrier after a phone call is completed.

The present invention may be embodied in hardware or software or a combination thereof disposed within a packet switched computer network. The present invention relates to routing telephony calls from a source network to a destination network via an IP network. A telephone call occurring via an IP network is often referred to as a "voice over IP" transaction. When a "voice over IP" transaction specifically involves the Internet, the description "Internet telephony" may also used to describe the transaction. An exemplary embodiment of the VoIP clearinghouse will be described with respect to Internet telephony. However, the principles of the VoIP clearinghouse of the present invention apply to all IP routed transactions, including, but not limited to, "voice over IP" calls, "fax over IP" calls, and "video over IP calls."

Referring now to the drawings, in which like numerals represent like elements throughout the several Figures, aspects of the present invention and the illustrative operating environment will be described.

Figure 2A:
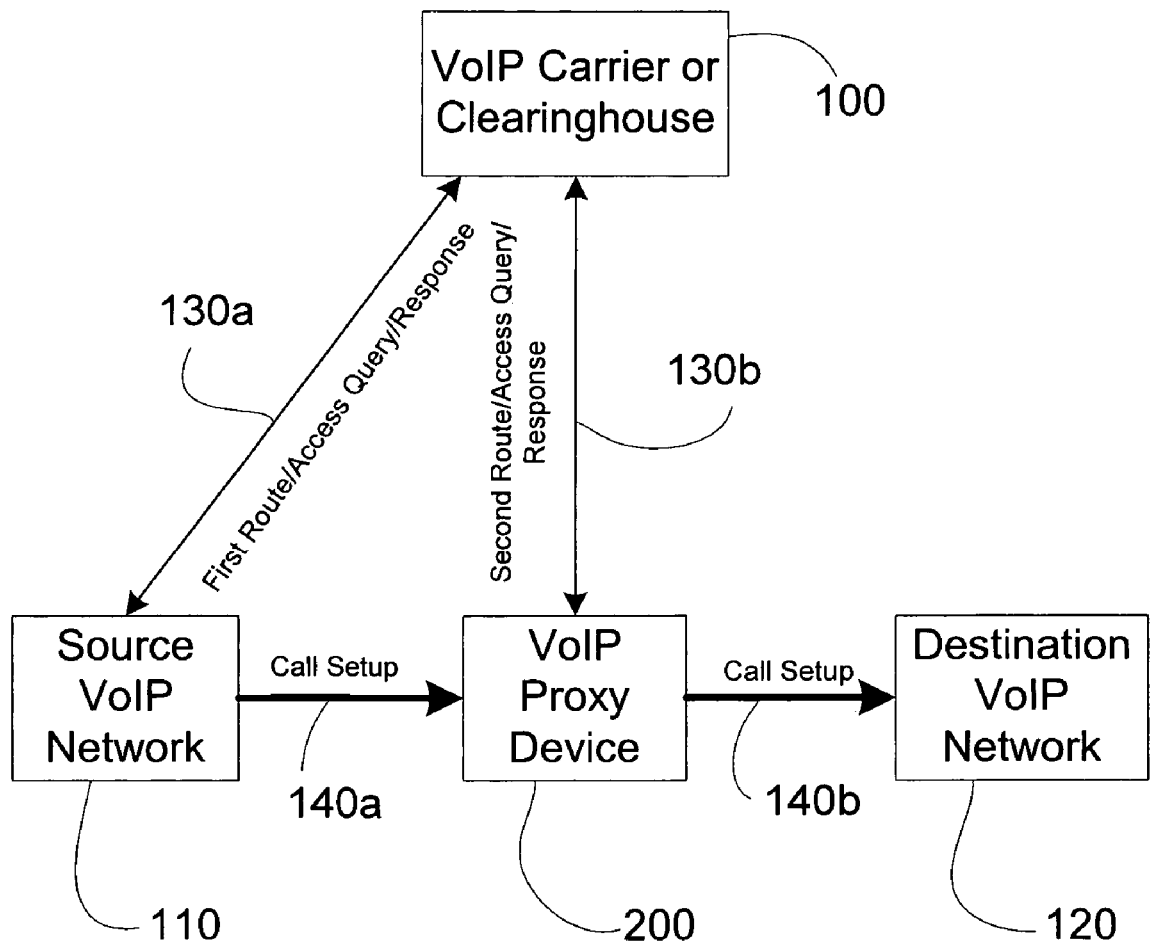
FIG. 2a is a functional block diagram of a conventional packet switched network that has a source VoIP network that communicates with a VoIP carrier and a VoIP proxy device/intermediate network to complete a phone call.
Figure 2B:
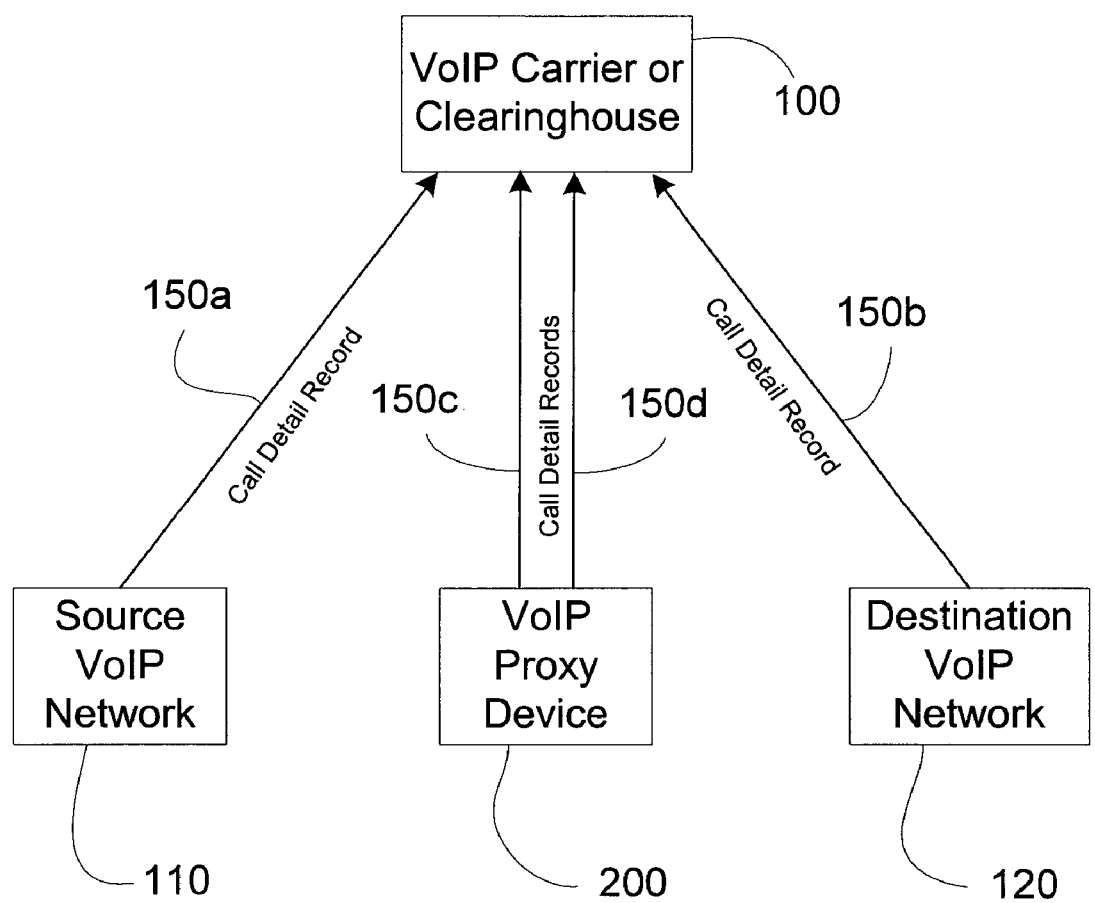
FIG. 2*b* is a functional block diagram of a conventional packet switched network that has a source VoIP network, VoIP proxy device/intermediate network, and a destination network that communicate call detail records to a VoIP carrier after a phone call is completed.
Figure 3A:
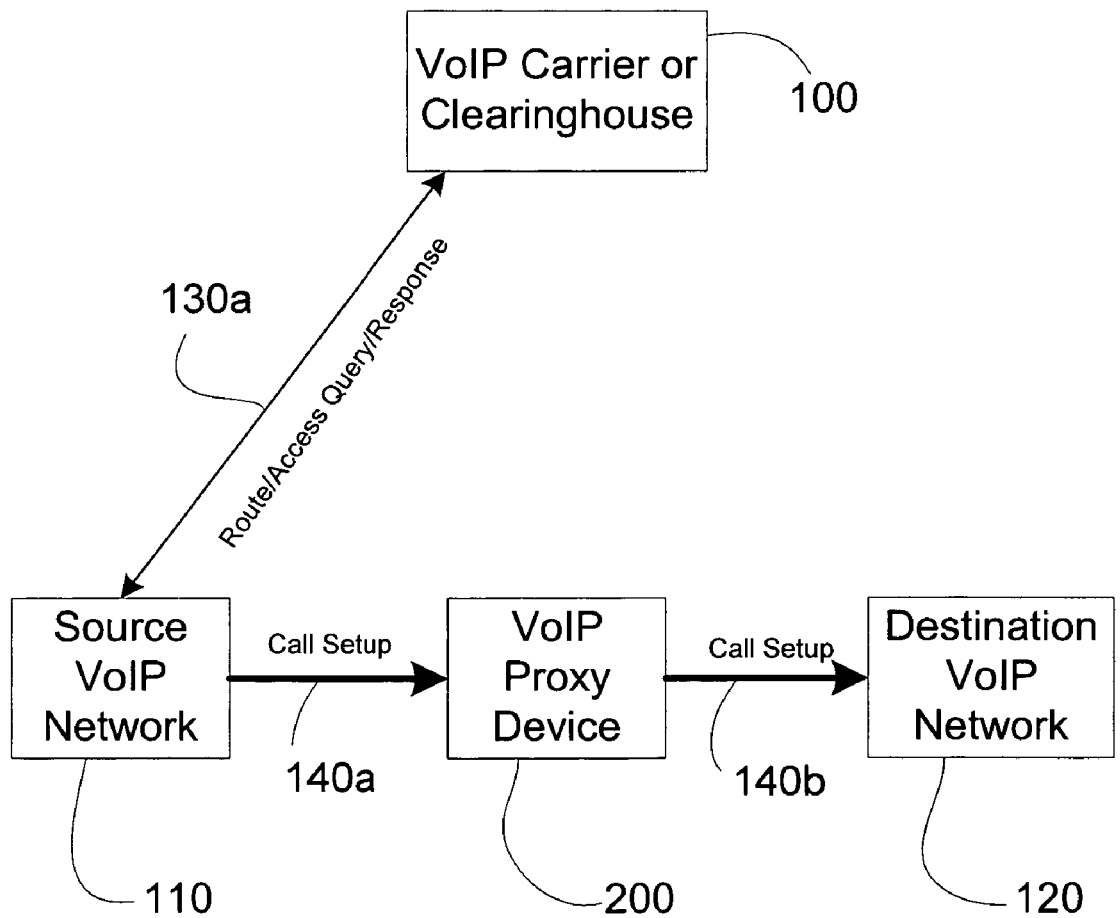
FIG. 3*a* is a functional block diagram of an exemplary packet switched network that has a source VoIP network that communicates with a VoIP carrier that provides authorization tokens for a VoIP proxy device/intermediate network and destination network to complete a phone call, according to one exemplary embodiment of the invention.

The invention, illustrated in FIG. 3*a* can provide significant optimization of the call scenario described in FIG. 2*a* by eliminating the need for the second route/access query 210. In FIG. 3*a*, a customer of the Source VoIP Network 110 dials a phone number that cannot be completed in the Source VoIP Network 110. The Source VoIP Network 110 sends a route/access query 130*a* to the VoIP Carrier 100. The VoIP Carrier 100 performs a route lookup to determine which IP address, or addresses, can terminate the VoIP call to the called number. In this route lookup, the VoIP Carrier 100 uses a routing algorithm that recognizes that the VoIP Proxy Device 200 cannot complete the call and that a second call leg from the VoIP Proxy Device 200 to the Destination VoIP Network 120 is required to complete the call.

The VoIP Carrier 100 returns the route/access query response 130*a* with the IP address of the VoIP Proxy Device 200 and a look ahead token. Embedded in the look ahead token is the IP address of the Destination VoIP Network 120. Given this information, the Source VoIP Network 110 performs a call setup 140*a* to the VoIP Proxy Device 200. The VoIP Proxy Device 200 validates the access token in the call setup and accepts the call.

In the token validation process, the VoIP Proxy Device recognizes the presence of the look ahead route to the Destination VoIP Network 120. The VoIP Proxy Device 200 then uses this IP address to complete the call to the Destination VoIP Network 120. The VoIP Proxy Device 200 then sends 140*b* a call setup to the Destination VoIP Network 120 which validates the look ahead access token and completes the call.

Figure 3B:
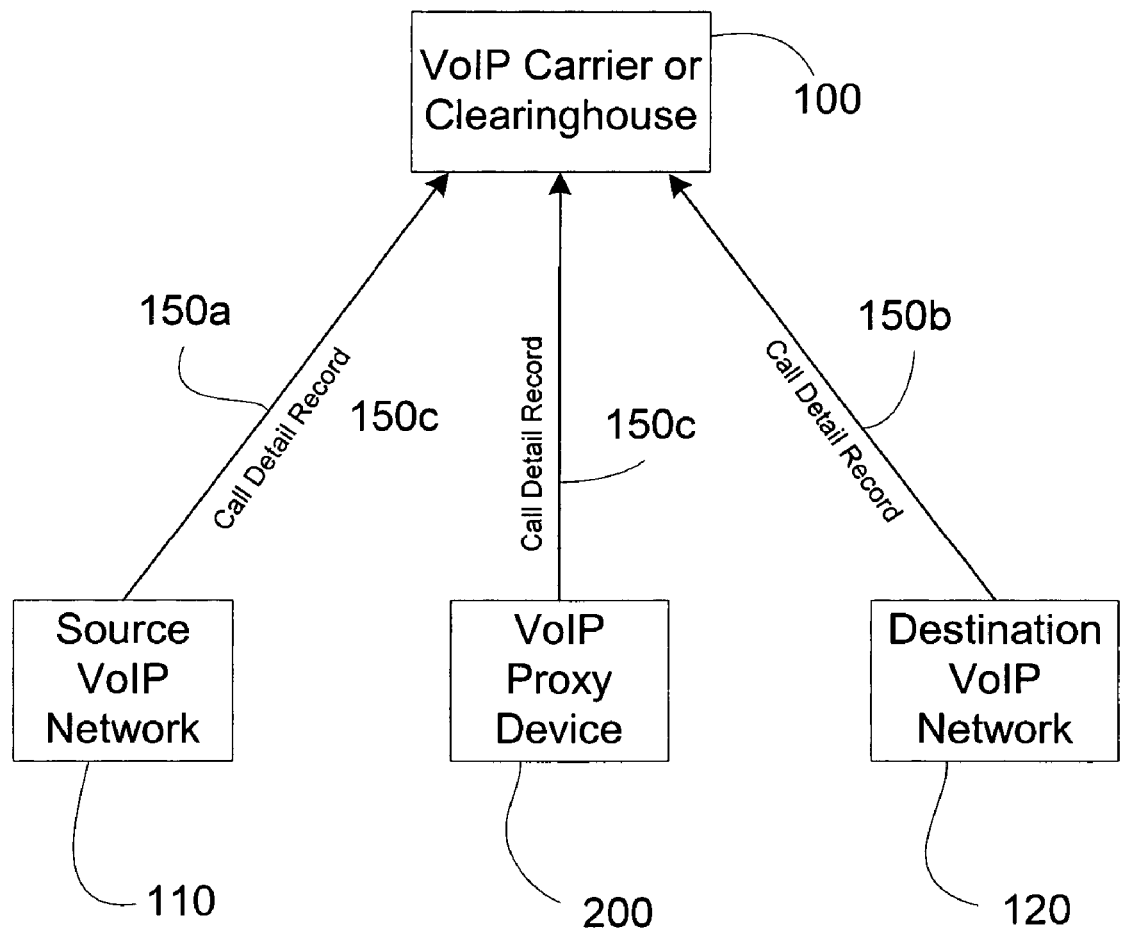
FIG. 3*b* is a functional block diagram of an exemplary packet switched network that has a source VoIP network, VoIP proxy device/intermediate network, and a destination network that communicate call detail records to a VoIP carrier after a phone call is completed, according to one exemplary embodiment of the invention.

FIG. 3*b* illustrates how call detail records are reported to the VoIP Carrier 100 when the call is finished. The Source VoIP Network 110 reports a source call detail record 350*a* for the call. The VoIP Proxy Device 200 reports a call detail record 350*c* of type "other" for the call. The Destination VoIP Network 120 reports a destination call detail record 350*b* for the call.

One important component required for the most general use case of look ahead tokens is a secure method for inter-domain access authorization among multiple domains that have no knowledge of one another. The secure access control among anonymous peers is enforced by a common central authority which is trusted by all peers. In VoIP, this authority is the VoIP inter-exchange carrier or clearinghouse 100. The use of Public Key Infrastructure (PKI) technology by a common certificate authority which digitally signs each inter-domain access token is a solution.

Figure 4:
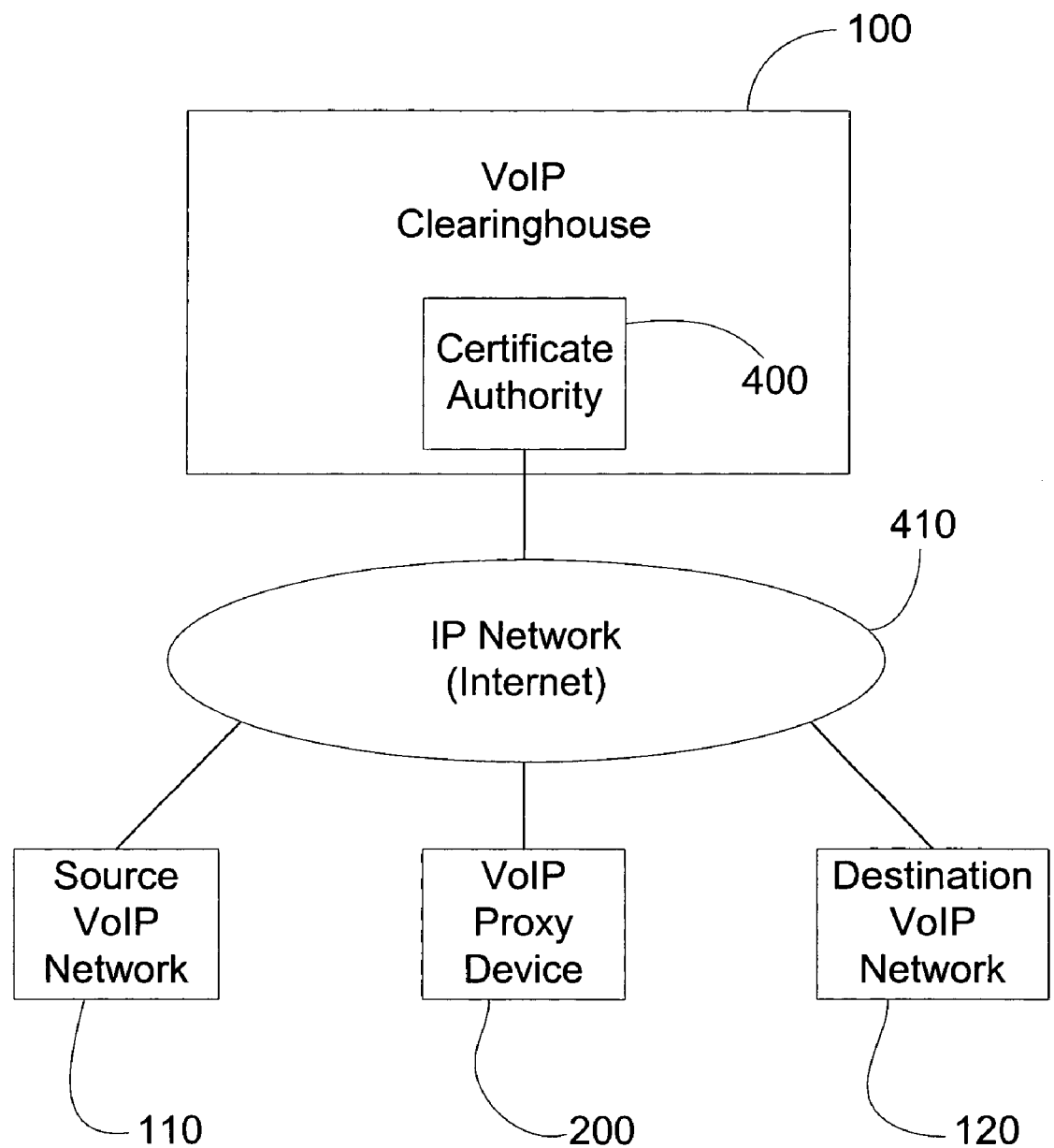
FIG. 4 is a functional block diagram of an exemplary packet switched network that has a source VoIP network and a VoIP carrier or clearinghouse that can comprise a certificate authority, according to one exemplary embodiment of the invention.

As illustrated in FIG. 4, a VoIP inter-exchange carrier or clearinghouse 100 can comprise certificate authority 400 to establish a trusted cryptographic relationship with each VoIP service provider. In this example, three domains are presented: the Source VoIP Network 110, the VoIP Proxy Device 200 and the Destination VoIP Network 120. These domains all may access each other and the certificate authority 400 via an IP Network or Internet 410. However, it is valid to extend this example to include millions of domains. Each one of these domains, may be autonomous and anonymous from the others. They have no knowledge or agreement to allow the exchange of IP communication sessions via an IP network 410. Each domain, would however, have (1) the certificate and assymetric public key of the common certificate authority and (2) a local certificate, defining the domain identity, signed by the certificate authority.

With this public key infrastructure in place, it is possible for the VoIP inter-exchange carrier or clearinghouse 100 to digitally sign an inter-domain access token which allows a Destination VoIP Network 120 to validate that a call setup request direct from an unknown Source VoIP Network 110 has been authorized by a trusted third party—the VoIP inter-exchange carrier or clearinghouse. This application provides an implementation example using public key infrastructure service. However, those skilled in the art will recognize that this invention can be applied using other techniques for secure inter-domain access control, such as simple passwords or symmetric key encryption.

With a mechanism in place, as described above, for a VoIP inter-exchange carrier or clearinghouse 100 to enforce inter-domain access control for direct peer to peer VoIP communications, the new art defined by this invention will be described below. The first innovation implemented by look ahead tokens is the multiple lookup routing algorithm.

Figure 5:
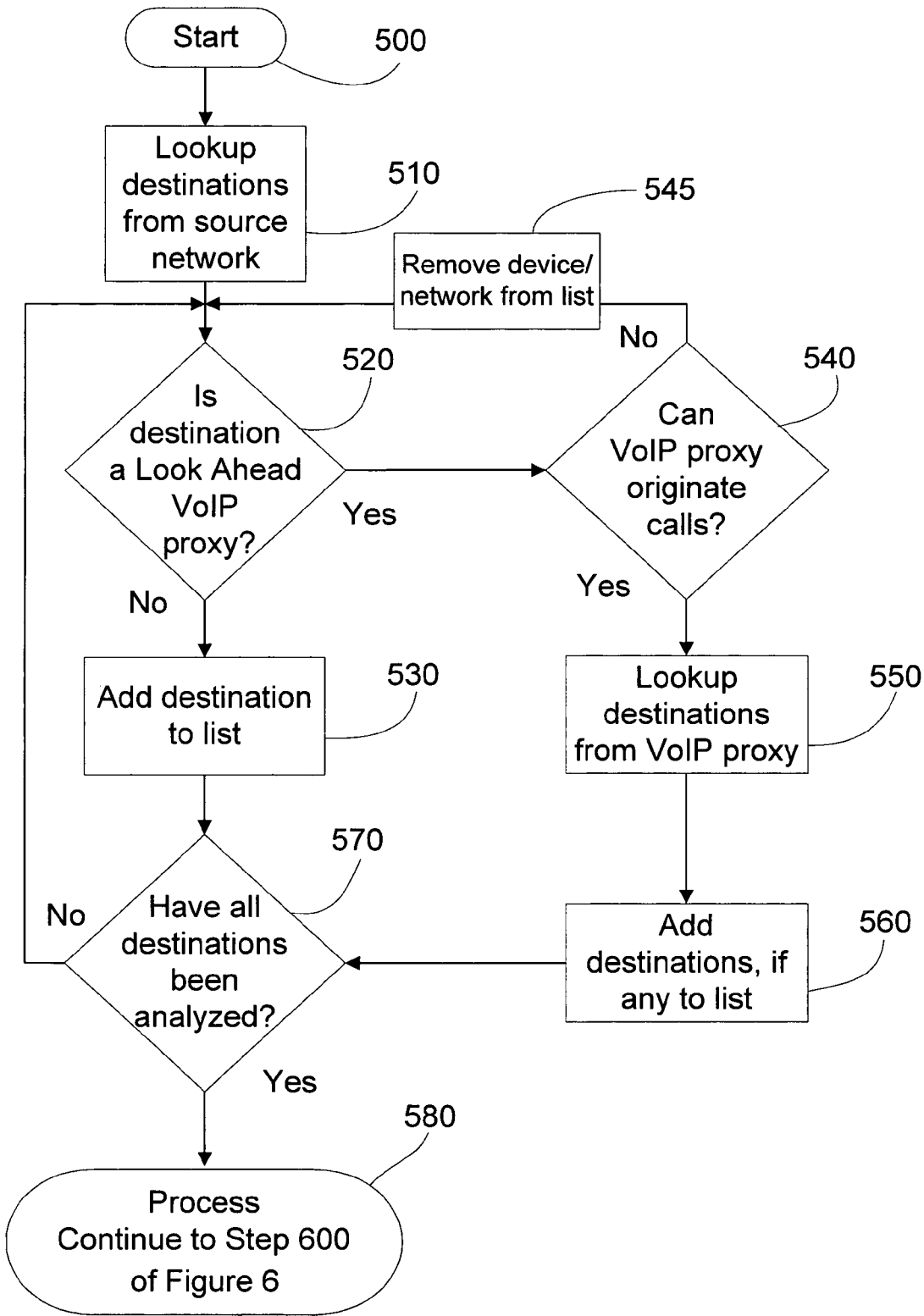
FIG. 5 is a logic flow diagram illustrating an exemplary method for looking up routing destinations across a packet switched computer network according on one exemplary embodiment of the invention.
Figure 6:
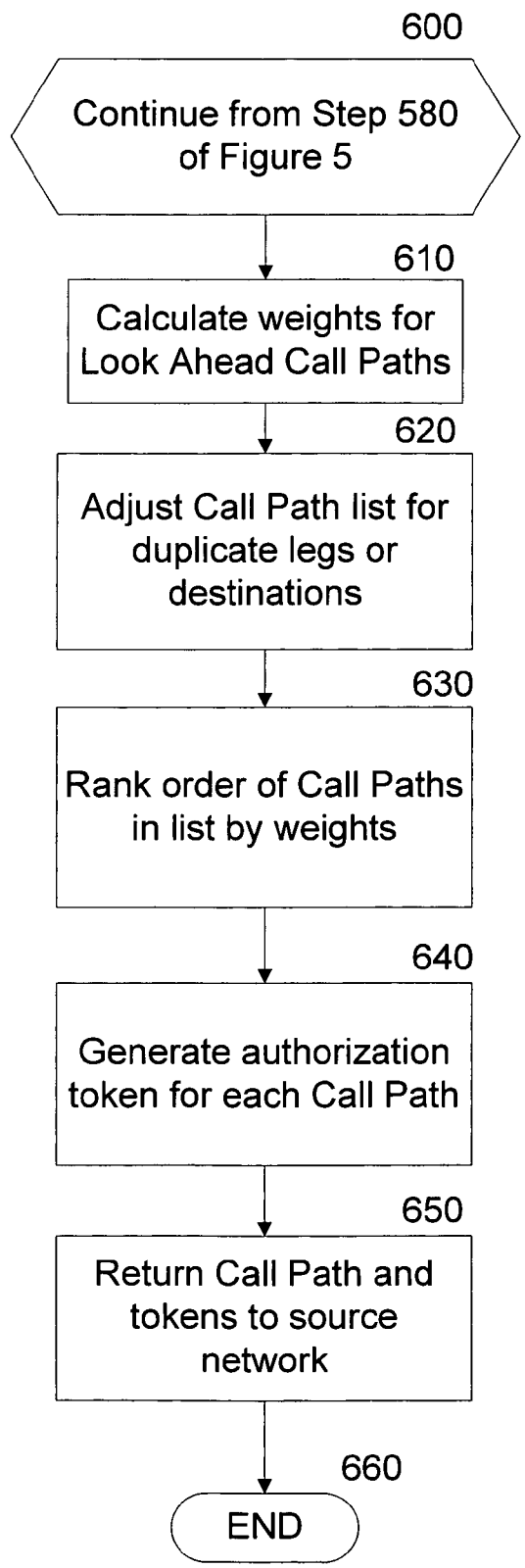
FIG. 6 is a continuation of the logic flow diagram of FIG. 5 that illustrates additional steps for completing a call such as calculating weights of call paths and ranking call paths by calculated weights according on one exemplary embodiment of the invention.

Referring to FIGS. 3a, 5, and 6, the following sections describe the process to create a look ahead token for multiple call paths. The description of the flow charts in the this detailed description are represented largely in terms of processes and symbolic representations of operations by conventional computer components, including a processing unit (a processor), memory storage devices, connected display devices, and input devices. Furthermore, these processes and operations may utilize conventional discrete hardware components or other computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Again, referring now to FIG. 5, the process starts when the VoIP Carrier 100 receives a routing/access query 130a from a Source VoIP Network 110. The query 130a is processed by a routing algorithm that starts with step 500 on FIG. 5.

The first step 510 in the routing algorithm is to determine which destination IP addresses have been defined to complete calls from the source network 110 to the called number 510. Criteria used to determine routing of calls from the source network or device 110 to intermediate networks 200 or destination devices or networks 120 may include, but is not limited to, business policies; quality of service requirements; interconnect pricing or credit policies defined specifically for the source network 110 and/or intermediate networks 200, destination networks or devices 120; weights assigned to intermediate networks 200 and destination networks or devices 120 that are used to determine how calls are load balanced or distributed across multiple intermediate and destination networks or devices 120, 200 serving the same called number and by device or network; properties defined for the source networks 110, intermediate networks 200, and destination networks or devices 120 that indicate technical capabilities, compatibilities, and protocol inter-working. The criteria described above used by the routing algorithm illustrated in FIG. 5 can be provisioned or assigned by the VoIP carrier or clearinghouse 100.

The results of step 510 will be a list of IP addresses for intermediate networks 200 and destination devices or networks 120 and a corresponding weight parameter which defines how the intermediate and destination devices 200, 120 will be ordered in priority. The source network 110 will use the order priority to determine which destination to attempt first if there are multiple devices serving the same called number.

Once this list of destination IP addresses has been determined in step 520, the list of devices is looked through or reviewed by the IP addresses, and it is determined which devices are VoIP proxy devices that support the functionality to validate a look ahead token and extract the routing information required for the next call leg of a call path. Step 520 can be facilitated by adding a property to the VoIP device definition that indicates that a particular device supports look ahead tokens. If the destination is not a VoIP proxy, the device is added to a final output list 530 of destinations. Step 570 determines if all potential destinations have been analyzed by step 520. If so, the routing algorithm proceeds to step 580. If not, the routing algorithm returns to step 520 to continue iterating through the original list of destination devices.

If step 520 determines that a destination device is a VoIP proxy 200 that supports look ahead tokens, the next step is step 540 in which it is determined if the destination network 120 or intermediate network 200 may originate calls. For business policy or other reasons, the VoIP Carrier may not allow calls to be originated or forwarded from the VoIP proxy.

If this is the case, the network is removed from the list in step 545 and the routing algorithm returns to step 520 to analyze the next device or network 120, 200 in the list of networks 120, 200.

If step 540 determines that the VoIP proxy or intermediate network 200 may originate or forward calls, the next step is to perform a second route lookup in step 550 based on the routing policies defined for the VoIP proxy device or intermediate network 200. If destinations for the VoIP proxy device/network 200 are identified in the second route lookup, in step 560, they are added to the final output list of destinations. These final destination devices are linked to the VoIP proxy 200 in the output list and will be included in a look ahead token created for call authorization to the VoIP proxy 200.

After step 560, this portion of the routing algorithm returns to step 570. If all destinations in the original list defined in step 510 have been analyzed, the routing algorithm proceeds to step 580. If not, the routing algorithm loops back to step 520.

Figure 7:
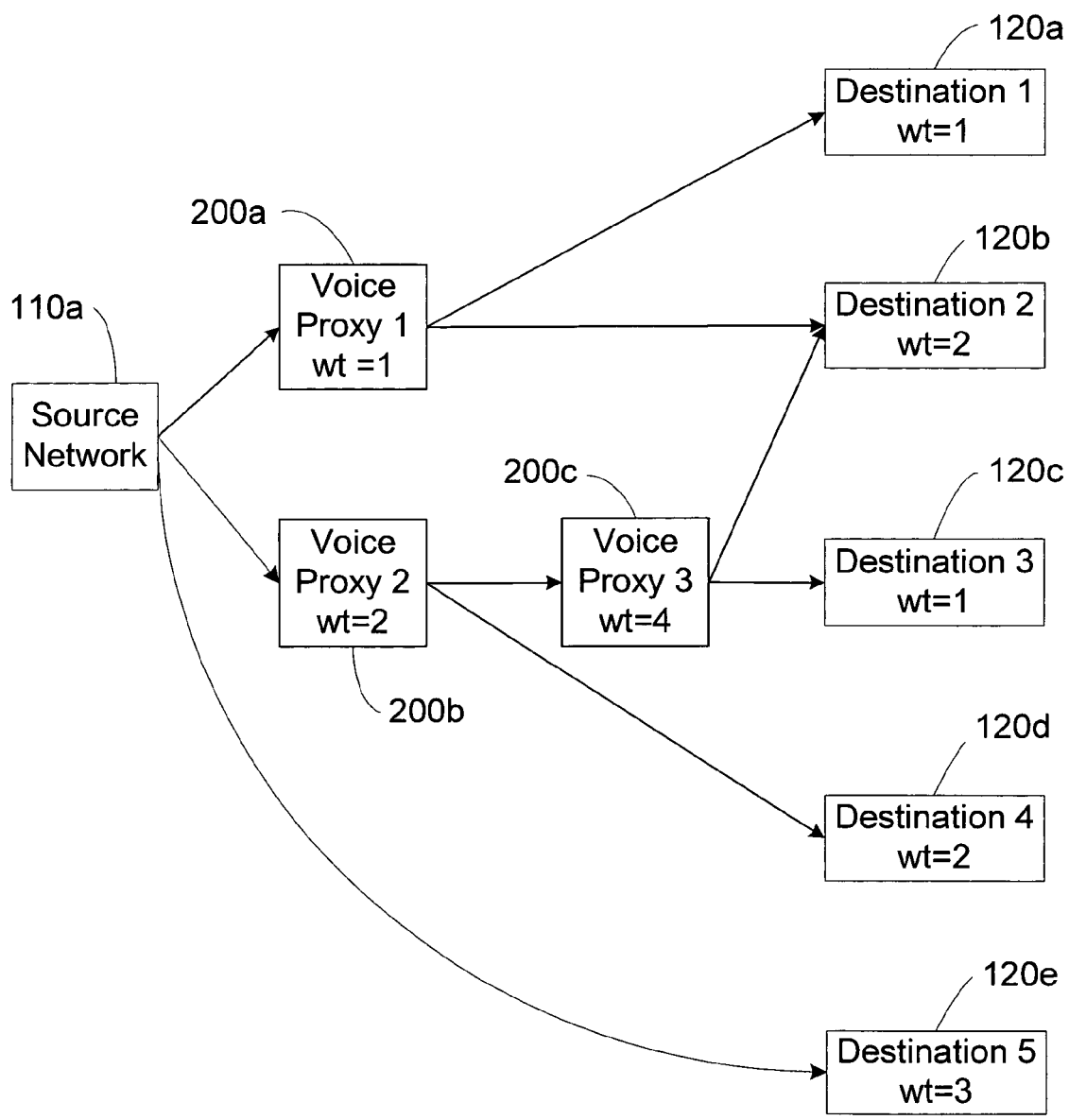
FIG. 7 is a functional block diagram of an exemplary packet switched network in which a source VoIP network can have several call paths that can be used to complete a call, according to one exemplary embodiment of the invention.

For simplicity, FIG. 5 illustrates the routing algorithm when the destinations defined in step 550 are the final destination for call termination. However, this invention also incorporates the functionality of supporting multiple intermediate VoIP proxies between the source and destination networks. In the case where the destination device for the second call leg is a VoIP proxy or intermediate network 200, the routing algorithm would return to step 540 and continue to loop through steps 540 and 550 until the entire chain of VoIP proxies and final destination device are identified. When this occurs, the list of linked devices referred to as "call paths" would be submitted together as a group to the final destination list. FIG. 7 is provided as an illustration of this functionality.

Referring now to FIG. 7, item 110*a* represents the Source Network. In this example, a call to called number can be completed by four different destination devices: Destination 1, 120*a*; Destination 2, 120*b*; Destination 3, 120*c*; Destination 4, 120*d*; and Destination 5, 120*e*. The arrows indicate the possible call paths from the Source Network 110*b*, through the different VoIP Proxies 200*a*, 200*b* and 200*c* to the final destination devices and directly to Destination 5, 120*e*.

The final output list of route destinations or call paths from the example presented in FIG. 7 would be as follows:

Voice Proxy 1 to Destination 1

Voice Proxy 1 to Destination 2

Voice Proxy 2 to Voice Proxy 3 to Destination 2

Voice Proxy 2 to Voice Proxy 3 to Destination 3

Voice Proxy 2 to Destination 4

Destination 5

After the routing algorithm completes through the iteration of multiple route look-ups as described in FIG. 5, the process continues to step 600 as illustrated in FIG. 6. The next function is to adjust destination weights of look ahead tokens for call paths in step 610. There are two methods for adjusting destination weights for look ahead tokens: a basic method and a normalized weights method.

The basic method simply multiplies the weights of each device in a call path. This approach is simple and works well when all possible call paths traverse the same number of devices. However, the basic method can lead to unexpected routing distribution when the alternative call paths traverse a different number of intermediate proxy devices.

Referring briefly to FIG. 7, Table 1 below provides an example adjusting weights using the basic method.

TABLE 1

Basic Weight Method

|  | First Call Leg | Second Call Leg | Third Call Leg | Call Path Weight | Percent of total |
|---|---|---|---|---|---|
| Call Path | VoIP Proxy 1 | Destination 1 | | | |
| Weights | 1 | 1 | | 1 * 1 = 1 | 2.94% |
| Call Path | VoIP Proxy 1 | Destination 2 | | | |
| Weights | 1 | 2 | | 1 * 2 = 2 | 5.88% |
| Call Path | VoIP Proxy 2 | VoIP Proxy 3 | Destination 2 | | |
| Weights | 2 | 4 | 2 | 2 * 4 * 2 = 16 | 47.06% |
| Call Path | VoIP Proxy 2 | VoIP Proxy 3 | Destination 3 | | |
| Weights | 2 | 4 | 1 | 2 * 4 * 1 = 8 | 23.53% |
| Call Path | VoIP Proxy 2 | Destination 4 | | | |
| Weights | 2 | 2 | | 2 * 2 = 4 | 11.76% |
| Call Path | Destination 5 | | | | |
| Weights | 3 | | | 3 | 8.82% |
| Total | | | | 34 | 100.00% |

In the previous example using the basic method of adjusting call path weights, calls from the Source Network 110*a* will be distributed as follows: three out of thirty-four calls, 8.82%, will be routed to VoIP Proxy 1 200*a*, twenty-eight out of thirty-four calls, 82.35%, will be routed to VoIP Proxy 2 200*b* and three out of thirty-four calls, 8.82%, will be routed to Destination 5 120*a*.

The normalized method differs from the basic method by normalizing the weights of each device by dividing each device weight by the sum of all device weights in the same call leg as illustrated in Table 2 below:

TABLE 2

Normalized Weight Method

| | First Call Leg | Second Call Leg | Third Call Leg | Call Path Weight | Percent of total |
|---|---|---|---|---|---|
| Call Path Weights | VoIP Proxy 1 1 | Destination 1 1 | | $1 * 1/(1+2) = \frac{1}{3}$ | 5.56% |
| Call Path Weights | VoIP Proxy 1 1 | Destination 2 2 | | $1 * 2/(1+2) = \frac{2}{3}$ | 11.11% |
| Call Path Weights | VoIP Proxy 2 2 | VoIP Proxy 3 4 | Destination 2 2 | $2 * 4/(4+2) * 2/(2+1) = \frac{8}{9}$ | 14.81% |
| Call Path Weights | VoIP Proxy 2 2 | VoIP Proxy 3 4 | Destination 3 1 | $2 * 4/(4+2) * 1/(2+1) = \frac{4}{9}$ | 7.41% |
| Call Path Weights | VoIP Proxy 2 2 | Destination 4 2 | | $2 * 2/(4+2) = \frac{2}{3}$ | 11.11% |
| Call Path Weights | Destination 5 3 | | | 3 | 50.00% |
| Total | | | | 6 | 100.00% |

In the previous example using the normalized method of adjusting call path weights, calls from the Source Network 110*a* will be distributed as follows: one out of six calls, 16.67%, will be routed to VoIP Proxy 1 200*a*, two out of six calls, 33.33%, will be routed to VoIP Proxy 2 200*b* and three out of six calls, 50.00%, will be routed to Destination 5 120*e*.

After weights have been adjusted for each call path, the next step is to adjust the list of destinations for duplicates 620. As the example in FIG. 7 illustrates, look ahead routing can result in duplicate destinations—Destination 2 120*b*_is a duplicate destination. The VoIP Carrier may choose as policy to eliminate call paths which lead to the same destination multiple times.

This feature is a configurable parameter in the look ahead routing algorithm which allows the VoIP carrier three choices: (1) never eliminate call paths that lead to the same destination, (2) when multiple call paths lead to the same destination, keep the call path with the highest weight and eliminate all other call path choices, or (3) only eliminate call paths for look ahead routes that lead to a duplicate destination.

Referring now to FIG. 6, the next step 630, is to rank the order of the call path choices based on their weights. The call paths may be rank ordered based on their weights, randomly ordered based on the weights, or randomly ordered regardless of weight. When call paths are rank ordered, the call paths are ranked according to their weight. The call path with the highest weight is usually first while the call path with the lowest weight is typically last.

When call paths are randomly ordered by weight, the weight is used to determine the probability a call path is randomly selected before other call paths. For example, if there are two call paths—Call Path A has a weight of one and Call Path B has a weight or three—then there is a 75% (1/(1+3)) probability that Call Path B will be rank ordered first and a 25% (1/(1+3)) probability that Call Path A will be rank ordered first.

After ordering call paths, the next step 640 is to generate an authorization token for each call path. The token is an information set which uniquely authorizes the specific call for which the token is created. The token typically includes, or is packaged with, some information that a VoIP proxy 200 or destination network 120 can use to validate that the call was authorized by the VoIP carrier. The VoIP proxy 200 or destination 120 will not accept a call setup request that does not include a valid token.

Those of ordinary skill in the art of security techniques will recognize there are many ways a token can be secured from tampering, such as, by the use of secret passwords or more commonly by signing the token with a digital signature. For example, the VoIP carrier 100 will sign an authorization token with its private key. The destination network 120 will then validate token using the VoIP carrier's public key. If the signature is valid, then the destination network 120 can be certain the token has not been altered since it was signed with the private key of the VoIP carrier.

An example of a standard authorization token, as used in the call scenario presented in Table 3 shown below. This token, written in XML format, provides information that uniquely authorizes the call.

TABLE 3

TOKEN WRITTEN IN XML FORMAT

```
<TokenInfo random='30113'>
<SourceInfo type='e164'>4045266060</SourceInfo>
<DestinationInfo type='e164'>2564286000</DestinationInfo>
<CallId encoding='base64'>
NjMzMDYxMzgzMDMxMzA2MTMyMzAzMDAwMDA=</CallId>
<ValidAfter>2004-12-02T20:37:58Z</ValidAfter>
<ValidUntil>2004-12-02T20:47:58Z</ValidUntil>
<TransactionId>4733140074823188489</TransactionId>
<UsageDetail>
    <Amount>14400</Amount>
    <Increment>1</Increment>
    <Service/>
    <Unit>s</Unit>
</UsageDetail>
</TokenInfo>
```

This token authorizes a call, lasting up to 14,400 seconds from calling number 4045266060 to called number 2564286000, with CallId NjMzMDYxMzgzMDMxMzA2MTMyMzAzMDAwMDA during a ten minute period between 8:37-8:47 p.m. on Dec. 2, 2004.

It is noted here that the information in a look ahead token is not limited to the information fields presented in the example above. Any relevant information may be included in a look ahead token. Examples of data fields which are readily useful for look ahead tokens are listed below Table 4:

TABLE 4

EXAMPLES OF LOOK AHEAD TOKEN DATA FIELDS

| Information Element | Note |
| --- | --- |
| Version | Version of the token |
| Random number | Any randomly generated number |
| Transaction ID generated by the settlement server | A unique number identified for the call |
| Contact ID | Identifies the Settlement Service provider |
| Valid after time | Call must be setup after this time |
| Valid until time | Call must be setup before this time |
| Calling Number | Number of the calling party |
| Calling Party Identification | Text description of calling party, i.e. John and Jane Doe. |
| Called Number | Number of the called party |
| Amount - Usage Detail | Amount of usage authorized |
| Increment - Usage Detail | Number of units per increment |
| Units - Usage Detail | Seconds, packets, bytes, pages, calls |
| Currency - Pricing Indication | Currency of transaction, i.e. USD |
| Setup - Pricing Indication | Fixed price per call |
| Amount - Pricing Indication | Price per increment |
| Increment - Pricing Indication | Units per increment |
| Units - Pricing Indication | Seconds, packets, bytes, pages, calls |
| Type of service | Service requested. Default is voice. |
| Destination address | Used for look ahead routing |
| Destination trunk group | Used for look ahead routing |
| Destination protocol | Used for look ahead routing |
| OSP Version | Used for look ahead routing |
| Call Identifier | Unique identifier for the call |
| Group ID (i.e for conference call admission) | Same as ConferenceID in H.323. Calls with unique CallIds can share a common GroupID. i.e a conference call. |
| Data Rate | Data rate requested for the call |
| Number of Channels | Number of channels requested |
| Bandwidth | Amount of bandwidth reserved |
| Quality of Service | Level of service quality requested |
| Quality of Service Class | Class of service quality requested |
| Answer Seizure Ratio (ASR) | Call completion ratio |
| Mean Hold Time (MHT) | Average call duration |
| Post Dial Delay (PDD) | Time between call initiation and the first ring at the called telephone. |

For a call path which includes a VoIP proxy 200, as illustrated in FIG. 3a, a single look ahead token can provide routing authorization for both the first call leg and the second call leg. A look ahead token will include all the information required for the first leg of the call to the VoIP proxy 200, plus the required routing information to the destination network 120. Below in Table 5 is an example of a look ahead token that is routed first to a VoIP proxy 200 and includes the routing information to the final destination network 120 with IP address 1.2.3.4.

TABLE 5

EXAMPLE OF XML FORMATTED LOOK AHEAD TOKEN

<TokenInfo random='30113'>
<SourceInfo type='e164'>4045266060</SourceInfo>
<DestinationInfo type='e164'>2564286000</DestinationInfo>

TABLE 5-continued

EXAMPLE OF XML FORMATTED LOOK AHEAD TOKEN

<CallId encoding='base64'>
NjMzMDYxMzgzMDMxMzA2MTMyMzAzMDAwMDA=</CallId>
<ValidAfter>2004-12-02T20:37:58Z</ValidAfter>
<ValidUntil>2004-12-02T20:47:58Z</ValidUntil>
<TransactionId>4733140074823188489</TransactionId>
<UsageDetail>
 <Amount>14400</Amount>
 <Increment>1</Increment>
 <Service/>
 <Unit>s</Unit>
</UsageDetail>
<LookAhead>
<DestinationAlternate type='transport'>[1.2.3.4]</DestinationAlternate>
<DestinationProtocol>SIP</DestinationProtocol>
<OSPVersion>2.1.1</OSPVersion>
</LookAhead>
</TokenInfo>

Note that the first thirteen lines of the look ahead token in Table 5 are identical to the standard token. The look ahead information is the three lines, in italics, between the LookAhead tags. The look ahead information includes: (1) the IP address of the destination network <DestinationAlternate type='transport'>[1.2.3.4]</DestinationAlternate> (2) the signaling protocol required by the destination network <DestinationProtocol>SIP</DestinationProtocol> and (3) the Open Settlement Protocol version supported by the destination network <OSPVersion>2.1.1</OSPVersion>. The look ahead token can include other information, such as destination trunk group, required to complete the call to the destination network.

Call paths with multiple VoIP proxies 200 would include multiple look ahead destinations listed in sequential order as logically defined by the call path with the final destination as the last information set before the end of the token. It is also important to note that a look ahead token can contain not on a call path with multiple intermediate destinations, but also multiple call paths.

FIG. 7 provides an example of call scenario that requires a look ahead token with two call paths and a call path with an intermediate network before the final destination. The call scenario described by FIG. 7 will result in three destinations and tokens provided to the source network 110a.

The first route is to Voice Proxy 1 200a. The token for this route includes look ahead routing information for Destination 1 120a and Destination 2 120b. The second route is to Voice Proxy 2 200b. The token for this route includes look ahead routing to Voice Proxy 3 200c and Destination 4 120d. The third route is Destination 5 120e.

Below is the look ahead token required for the second route in FIG. 7. It provides an example of a look ahead token with both multiple call paths and intermediate networks For this example, IP addresses in the DestinationAlternate fields have been replaced with figure references. The first look ahead route in this token provides routing information for the call path from Voice Proxy 2 200b to Voice Proxy 3 200c then two call paths from Voice Proxy 3 200c to Destination 2 120b and Destination 3 120c. The second look ahead route in this token provides routing information for the call path to Destination 4 120d.

```
<TokenInfo random='30113'>
<SourceInfo type='e164'>4045266060</SourceInfo>
<DestinationInfo type='e164'>2564286000</DestinationInfo>
<CallId
encoding='base64'>
NjMzMDYxMzgzMDMxMzA2MTMyMzAzMDAwMDA=</CallId>
<ValidAfter>2004-12-02T20:37:58Z</ValidAfter>
<ValidUntil>2004-12-02T20:47:58Z</ValidUntil>
<TransactionId>4733140074823188489</TransactionId>
<UsageDetail>
      <Amount>14400</Amount>
      <Increment>1</Increment>
      <Service/>
      <Unit>s</Unit>
</UsageDetail>
<LookAhead>
<DestinationAlternate type='transport'>[200c]</DestinationAlternate>
<DestinationProtocol>H323-Q931</DestinationProtocol>
<OSPVersion>1.3.4</OSPVersion>
<LookAhead>
<DestinationAlternate type='transport'>[120b]</DestinationAlternate>
<DestinationProtocol>SIP</DestinationProtocol>
<OSPVersion>2.1.1</OSPVersion>
</LookAhead>
<LookAhead>
<DestinationAlternate type='transport'>[120c]</DestinationAlternate>
<DestinationProtocol>SIP</DestinationProtocol>
<OSPVersion>2.1.1</OSPVersion>
</LookAhead>
</LookAhead>
<LookAhead>
<DestinationAlternate type='transport'>[120d]</DestinationAlternate>
<DestinationProtocol>H323-Q931</DestinationProtocol>
<OSPVersion>1.3.4</OSPVersion>
</LookAhead>
</TokenInfo>
```

In this exemplary call scenario, Voice Proxy 2 200*b* would validate the token received from Source Network 110*a* and extract the first look ahead IP address which is Voice Proxy 3 200*c*. Voice Proxy 2 200*b* would then send a call setup to Voice Proxy 3 200*c*. If the call attempt is successful, Voice Proxy 3 200*c* would validate the token and recognize that the first look ahead destination was its own address. The second VoIP 200*b* proxy would ignore this address and would extract the next IP address, Destination 2 120*b* as the next destination. Voice Proxy 3 200*c* would the route the call to Destination 2 120*b*. Destination 2 120*b* would validate the token and would recognize that its IP address as the last destination. The final destination 120 would then complete the call to the called telephone number.

If the call attempt from Voice Proxy 3 200*c* to Destination 2 120*b* is unsuccessful, Voice Proxy 3 200*c* will retry the call to the second look ahead route, Destination 3 120*c*. If the call attempt is successful, Destination 3 120*c* will validate the token and complete the call.

If the call attempt from Voice Proxy 3 200*c* to Destination 3 120*c* is not successful the call attempt retry options for Voice Proxy 3 200*c* will be exhausted. Voice Proxy 3 200*c* will signal Voice Proxy 2 200*b* that it cannot complete the call. Voice Proxy 2 200*b* will then retry the call attempt using its second call path to Destination 4 120*d*. If the call attempt to Destination 4 120*d* is successful, the call will be completed to the called number. The call attempt is not successful, the call attempt retry options for Voice Proxy 2 200*b* will be exhausted. Voice Proxy 2 200*b* will then signal Source Network 110*a* that it cannot complete the call.

The tokens presented in previous examples use a XML syntax. However, this same invention can be applied to tokens of any syntax. For example, Table 6 below defines ASCII tags for token information elements. The corresponding XML tag is presented in the left hand column.

TABLE 6

ASCII TAGS FOR TOKEN INFORMATION ELEMENTS

| Tag | Information Element | XML Tag |
|---|---|---|
| V | Version | <Version> |
| r | Random Number | <TokenInfo random='30113'> |
| I | Transaction ID generated by the settlement server | <TransactionId> |
| x | ContactID | <ContactId> |
| a | Valid After Time | <ValidAfter> |
| u | Valid Until Time | <ValidUntil> |
| c | Calling Number | <SourceInfo> |
| J | Calling Party Identification | <CallingPartyId> |
| C | Called Number | <DestinationInfo> |
| M | Amount - Usage Detail | <Amount> (within <UsageDetail>tags) |
| n | Increment - Usage Detail | <Increment> (within <UsageDetail>tags) |
| U | Units - Usage Detail | <Units> (within <UsageDetail>tags) |
| y | Currency - Pricing Indication | <Currency> (within <PricingIndication>tags) |
| p | Setup - Pricing Indication | <Setup> (within <PricingIndication>tags) |
| m | Amount - Pricing Indication | <Amount> (within <PricingIndication>tags) |
| N | Increment - Pricing Indication | <Increment> (within <PricingIndication> tags) |
| f | Units - Pricing Indication | <Units> (within <PricingIndication> tags) |
| s | Type of service | <Service> |
| d | Destination address for look ahead routing | <DestinationAlternate type='transport'> |
| e | Destination trunk group for look ahead routing | <DestinationAlternate type='network'> |
| D | Destination protocol for look ahead routing | <DestinationProtocol> |
| o | OSP Version for look ahead routing | <OSPVersion> |

TABLE 6-continued

ASCII TAGS FOR TOKEN INFORMATION ELEMENTS

| Tag | Information Element | XML Tag |
|---|---|---|
| K | Look Ahead tag | <LookAead> |
| i | Call Identifier | <CallId encoding='base64'> CallId may or may not be encoded |
| G | Group ID | <GroupId> |
| R | Data Rate | <DataRate> |
| b | Number of Channels | <NumberOfChannels> |
| B | Bandwidth | <Bandwidth> |
| Q | Quality of Service | <QualityOfService> |
| q | Quality of Service Class | <QoSClass> |

For further illustration, a comparison of identical look ahead tokens in XML format and ASCII format is provided below. The look ahead information of the tokens are in italics. The tokens described below would apply to a call with one intermediate VoIP proxy 200 and a destination network 120 as illustrated in FIG. 3*a*. Note that these look ahead tokens have been expanded to include additional pricing indication information. The pricing indication information documents what the VoIP carrier 100 will pay the VoIP proxy operator and the destination network operator to complete the call.

In this example, the operator of the VoIP proxy will be paid $0.01 USD per 60 seconds to transmit the call. The call setup fee is $0.00 USD. The destination network will be paid $0.02 USD per 60 seconds to complete the call. The call setup fee is $0.00 USD.

```
<TokenInfo random='30113'>
<SourceInfo type='e164'>4045266060</SourceInfo>
<DestinationInfo type='e164'>2564286000</DestinationInfo>
<CallId
encoding='base64'>
NjMzMDYxMzgzMDMxMzA2MTMyMzAzMDAwMDA=</CallId>
<ValidAfter>2004-12-02T20:37:58Z</ValidAfter>
<ValidUntil>2004-12-02T20:47:58Z</VaiidUntil>
<TransactionId>4733140074823188489</TransactionId>
<UsageDetail>
    <Amount>14400</Amount>
    <Increment>1</Increment>
    <Service/>
    <Unit>s</Unit>
</UsageDetail>
<PricingIndication>
    <Currency>USD</Currency>
    <Setup>0<Setup>
    <Amount>0.01</Amount>
    <Increment>60</Increment>
    <Unit>s</Unit>
</PricingIndication>
<LookAhead>
<DestinationAlternate
type='transport'>[1.2.3.4]</DestinationAlternate>
<DestinationAlternate type='network'>TrunkGrp1<DestinationAlternate>
<DestinationProtocol>H323-Q931</DestinationProtocol>
<OSPVersion>1.3.4</OSPVersion>
<PricingIndication>
    <Currency>USD</Currency>
    <Setup>0<Setup>
    <Amount>0.02</Amount>
    <Increment>60</Increment>
    <Unit>s</Unit>
</PricingIndication>
</LookAhead>
</TokenInfo>
```

Example Token in ASCII Format

```
V=1
r=30113
c=4045266060
C=2564286000
i= NjMzMDYxMzgzMDMxMzA2MTMyMzAzMDAwMDA=
a=2004-12-02T20:52:30Z
u=2004-12-02T21:02:30Z
I=4733144047667937289
A=14400
n=1
s=
U=s
y=USD
p=0
m=0.01
N=60
f=s
d=1.2.3.4
e=TrunkGrp1
D=H323-Q931
o=1.3.4
y=USD
p=0
m=0.02
N=60
f=s
```

Referring briefly back to FIG. 6, after the appropriate token has been generated for call path in step 640, the final step 650 is to return the routing information and token to the source network.

While this invention has been described in detail with particular reference to preferred embodiments thereof, it will be understood that variations and modifications can be effected within the spirit and scope of the invention as described hereinabove and as described in the appended claims.

What is claimed is:

1. A method for completing a phone call over a computer network, comprising:
    scanning the computer network for destination networks that are able to complete the call;
    scanning the computer network for intermediate networks that are linked to one of another intermediate network and a destination network capable of completing the call;
    for each intermediate network that is discovered, determining if the intermediate network is capable of further routing the call to one of another intermediate network and destination network;

forming a list of one or more call paths, each call path comprising at least one of an intermediate network for further routing the call and a destination network for completing the call;

generating an authorization token for each network in a call path; and providing access to the list in response to the request for competing the call.

2. The method of claim 1, wherein generating an authorization token further comprises generating the authorization token comprising a list of alternate networks that can service a call in case of call failure.

3. The method of claim 1, wherein generating an authorization token further comprises generating the authorization token comprising pricing information for servicing a call.

4. The method of claim 1, wherein generating an authorization token further comprises generating the authorization token comprising quality of service information.

5. The method of claim 1, further comprising calculating weights for each call path in the list.

6. The method of claim 1, further comprising ranking an order of the list based on weights associated with each network.

7. The method of claim 5, wherein calculating weights for each call path further comprises multiplying weights of each network in a call path.

8. The method of claim 5, wherein calculating weights for each call path further comprises normalizing the weights of each network in a call path.

9. The method of claim 8, wherein normalizing the weights of each network in a call path further comprises dividing a weight of each network by a sum of all weights in a same call leg.

10. The method of claim 1, further comprising adjusting the list for duplicate call paths.

11. The method of claim 10, wherein adjusting the list for duplicate call paths further comprises keeping call paths with higher weights and removing call paths from the list with lower weights.

12. The method of claim 10, wherein adjusting the list for duplicate call paths further comprises removing call paths from the list that use a same intermediate network or a same destination network.

13. The method of claim 1, wherein generating an authorization token for each network in a call path further comprises generating authorization tokens for alternate networks in a call path when alternate networks exist in a particular call path.

14. A system for completing phone calls over a packet switched computer network, comprising:

a source network for originating a phone call;

an intermediate network for routing the phone call and operatively linked to the source network;

a destination network for completing the phone call and operatively linked to the intermediate network;

a clearinghouse database operatively linked to the source network, the intermediate network, and the destination network; the clearinghouse database comprising data for correlating telephone numbers and computer network addresses and data describing relationships between intermediate networks and destination networks, the clearinghouse database forming a list of one or more call paths that comprise at least one of an intermediate network for further routing the call and a destination network for completing the call, the clearinghouse database generating an authorization token for each network in a call path.

15. The system of claim 14, wherein the clearinghouse database determines if each intermediate network is capable of further routing the call to one of another intermediate network and destination network.

16. The system of claim 14, wherein each intermediate network comprises a voice over internet protocol proxy device.

17. The method of claim 14, wherein at least one destination network comprises a voice over internet protocol destination network.

18. A method for completing a voice over Internet protocol phone call, comprising:

scanning the Internet for destination networks that are able to complete the call;

scanning the Internet for intermediate networks that are linked to one of another intermediate network and a destination network capable of completing the call;

for each intermediate network that is discovered, determining if the intermediate network is capable of further routing the call to one of another intermediate network and destination network;

forming a list of one or more call paths, each call path comprising at least one of an intermediate network and a destination network;

generating an authorization token for each network in a call path; and ranking the list of call paths based on weights associated with each network in a call path.

19. The method of claim 18, further comprising calculating weights for each call path in the list.

20. The method of claim 18, further comprising adjusting the list for duplicate call paths.

* * * * *